United States Patent [19]
Milam et al.

[11] 3,866,141
[45] Feb. 11, 1975

[54] BANDWIDTH-LIMITED, CAVITY-DUMPED, LASER SYSTEM

[75] Inventors: David Milam, Burlington; Audun Hordvik, Acton; Rudolph A. Bradbury, Saugus; Howard R. Schlossberg, Lexington, all of Mass.

[73] Assignee: The United States of America as represented by the Secretary of the United States Air Force, Washington, D.C.

[22] Filed: Dec. 21, 1973

[21] Appl. No.: 427,287

[52] U.S. Cl. .......................................... 331/94.5 M
[51] Int. Cl. ............................................. H01s 3/10
[58] Field of Search ............ 331/94.5; 356/106, 111

[56] References Cited
UNITED STATES PATENTS
3,663,890  5/1972  Schulthess et al. ............ 331/94.5 C
3,766,393  10/1973  Herzog et al. .................. 331/94.5 M Primary Examiner—William L. Sikes
Attorney, Agent, or Firm—Harry A. Herbert, Jr.; Jacob N. Erlich

[57] ABSTRACT

A bandwidth-limited, cavity-dumped laser system having a mode-locked laser cavity in which the rear mirror thereof is replaced by a Michelson interferometer. A pulsed phase shifter with ends cut at Brewster's angle is placed in one arm of the interferometer. When a 90° phase shift is abruptly applied to the one interferometer arm after the mode-locked pulse has reached peak intensity, the pulse will be dumped from the laser cavity.

9 Claims, 3 Drawing Figures

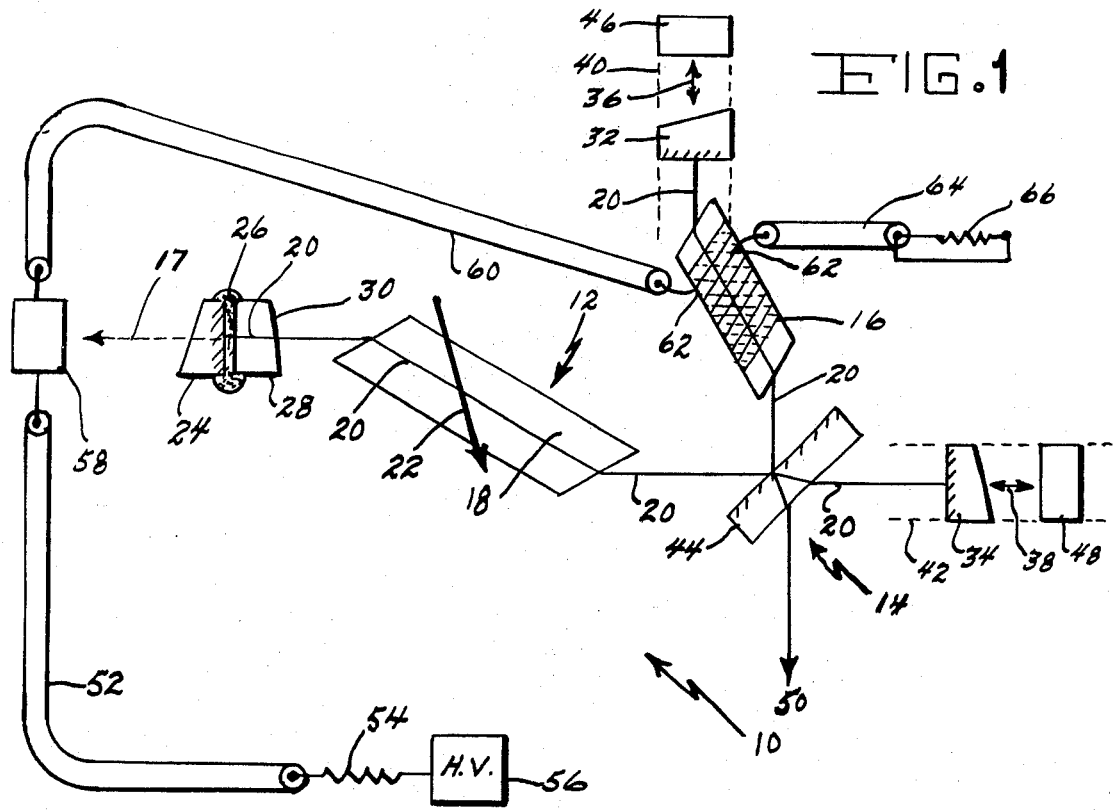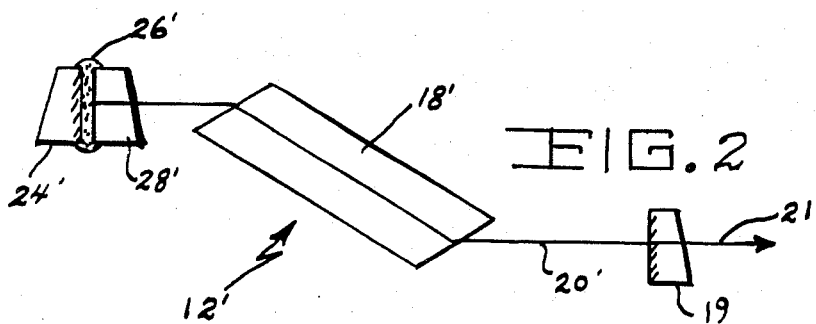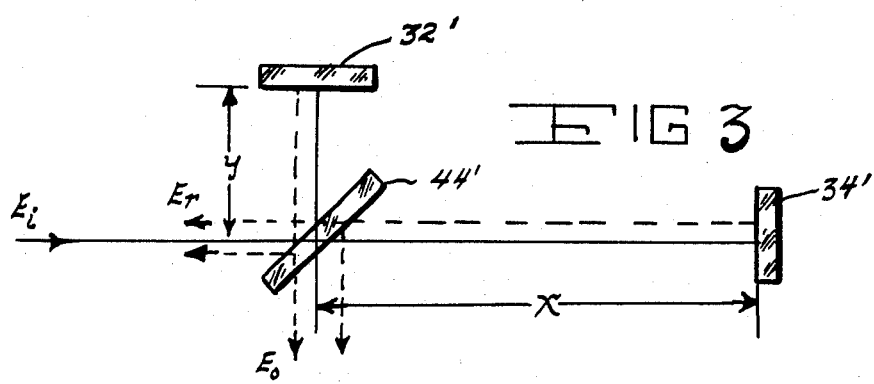

BANDWIDTH-LIMITED, CAVITY-DUMPED, LASER SYSTEM

BACKGROUND OF THE INVENTION

This invention relates generally to lasers, and, more particularly to a laser system for producing cavity dumped, controlled-duration mode locked pulses.

Lasers are now established in the art for generating coherent electromagnetic radiation in the optical frequency range. The operation of a laser is based upon the fact that the atomic systems represented by the atoms of the laser material can exist in any of a series of discrete energy level or states, the systems absorbing energy in the optical frequency range in going to a higher state and emitting it when going to a lower state. In the case of ruby as a laser material, three energy levels are utilized. The atomic systems are raised from the lower or ground level to the higher of the three levels by irradiation from a strong light source which need not be coherent but should preferably have a high concentration of energy in the absorbing wavelengths. A radiationless transition then occurs from the highest state to an intermediate or metastable state. This is followed by a transition with photon emission from the intermediate state back to the ground state. It is the last transition that is of interest since this transition is the source of the coherent light or electromagnetic energy produced by the laser.

The operation of raising the energy level of the laser material to produce the desired photon emission is referred to in the art as "pumping" and when more atoms reach an excited metastable state than remain in a lower energy level, a "population inversion" is said to exist.

The active material in the laser is made optically resonant by placing reflectors at either end thereof. Reflectors external to the laser material may be used but in the case of solid materials, such as a ruby rod, each end of the rod may be mirrored. The reflector on at least one end of the material is made partially transmissive so that there will be an escape from the resonant chamber.

Heretofore, by modification of the above mentioned laser it has been possible to generate short-time-duration, high-peak power laser pulses, i.e., laser pulses having picosecond time duration and peak power in excess of $10^9$W.

There are numerous reasons why interest has risen in the generation of such optical pulses. Numerous applications of single and multiple high-peak-power laser pulses of $10^{-9}$- to $10^{-13}$-second duration are potentially very attractive. An optical pulse of $10^{-13}$-second duration at a wavelength of approximately 1 micron rises from zero to $10^{10}$ watts in approximately 50 optical cycles; $10^{-13}$ second is the time required for light to travel 0.003 centimeter, 3× and $10^{-3}$ centimeter therefore represents the length of this wave packet of light. The interaction of such extremely, short, high-power light pulses with both organic and inorganic matter is therefore of great interest to academic, military, and industrial researchers. The application of such pulses to research on optically generated plasmas, optical radar, optical computers, high-speed photography and holography, optical and vibrational spectroscopy of liquids, solids, and gases, nonlinear optical properties of materials, photon echoes, precursor wave studies, transient response of optical instruments, and velocity of light measurements appears very promising. For example, such pulses would make it possible to measure distances of many kilometers to within fractions of a millimeter. Since atoms radiate for $10^4$ or more optical cycles, such pulses would make possible experimental investigation of the impulse response of quantum systems and of optical instruments. Electrical pulses having a rise time of less than $10^{-10}$ second, amplitudes of 60 to 100 volts, and repetition period as short as 1.5 nanosecond have already been obtained, through use of fast photodiodes as detectors. Such electrical pulses should fine application in the electronics industry, for determining the location and severity of internal reflections in wide-bandwidth transmission systems, studying propagation delay, making bandwidth measurements, and so on.

The output of the normal mode-locked laser as set forth hereinabove is a train of pulses, each 5–50 psec in duration, with individual pulses spaced in time by the round trip transit time of the laser cavity.

Heretofore, numerous devices, such as Pockel's cell shutters have been used as intercavity elements to dump the circulating short pulse from the laser into some direction not along the normal lasing path, so that this emission would be a single 5–50 psec pulse rather than a train of such pulses. The use of a Pockel's cell shutter inside the cavity is objectionable since it introduces about 10 additional optical surfaces into the cavity. These extra surfaces greatly increase optical scattering which degrades the performance of the laser. Furthermore, the calcite prism used with the shutter damages more readily than other elements in the cavity. In addition, if a pulse of longer duration, perhaps 200 psec, is desired, the end mirror is replaced with a two surface etalon. Since a given etalon leads to a given pulse duration, a different etalon must be installed each time the duration of the pulse is to be altered.

SUMMARY OF THE INVENTION

The laser system of this invention allows for a controllable pulse duration without resorting to a set of etalons to obtain similar effects as well as allowing for the cavity dumping of a pulse without the use of calcite prisms inside the laser cavity. In so doing the instant invention overcomes the problems encountered in the past and as set forth hereinabove.

The preferred embodiment of the laser configuration of this invention is made up of a standard mode-locked laser cavity in which the rear 100 percent oscillator mirror is replaced by a Michelson interferometer. A pulsed phase shifter, with ends cut at Brewster's angle, is placed in one arm of the interferometer. When the optical length of the two interferometer arms is the same, the laser will emit mode-locked pulses characteristic of the cavity as it existed before replacement of the mirror with the interferometer. If a 90° phase shift is abruptly applied to the one interferometer arm after the mode-locked pulse has reached peak intensity, the pulse will be dumped from the laser cavity.

If a slight difference is established in the optical path lengths of the two interferometer arms, the bandwidth of the lasing will be limited to a value less than the lasing bandwidth obtainable with equal length arms. Since the duration of a mode-locked pulse is inversely dependent on the spectral bandwidth of the pulse, a decrease in bandwidth will lead to an increase in pulse width. The configuration therefore allows the duration of mode-locked pulses to be increased, and the wider pulse can still be dumped from the laser cavity by application of a 90° phase shift to one interferometer arm.

The electronic circuitry for driving the phase shifter is in the form of a charged co-axial line with a charge limiting resistor with the co-axial line being discharged by a laser activated switch into a similar cable. This cable is connected to electrodes on the phase shifter. There is sufficient leakage through the rear reflective surface of the laser system to trigger the above mentioned switch.

It should also be noted that with minor alterations the instant invention is also suitable for other cavity dumping operations to produce bandwidth-limited cavity dumped pulses.

It is therefore an object of this invention to provide a laser system capable of producing cavity dumped laser pulses.

It is a further object of this invention to provide a laser system capable of producing cavity dumped pulses of controlled duration.

It is still another object of this invention to provide a bandwidth-limited cavity-dumped laser system which is highly reliable in operation, economical to produce, and which utilizes conventional currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DESCRIPTION OF THE DRAWINGS

FIG. 1 is a schematic illustration of the bandwidth-limited, cavity-dumped laser system of this invention;

FIG. 2 is a schematic illustration of a conventional, mode-locked laser system; and FIG. 3 is an enlarged schematic illustration of the Michelson interferometer utilized in the bandwidth-limited, cavity-dumped laser system of this invention.

DETAILED DESCRIPTION OF THE PREFERRED EMBODIMENT

Reference is now made to FIG. 1 of the drawing which best illustrates the laser system 10 of this invention which will allow cavity dumping of a mode-locked pulse without use of calcite prisms. In addition it is possible to control the pulse duration.

Laser system 10 is made up of a standard mode-locked laser cavity 12 in which the rear mirror utilized therewith is replaced by a Michelson interferometer 14 having a pulsed elctro-optic phase shifter 16 in the form of a KDP crystal, for example, with the ends cut at Brewster's angle placed in one arm thereof. The laser cavity 12 utilizes a conventional laser medium 18 such as a ruby rod which must be cut at a Brewster's angle and is pumped by any suitable pump pulse 22 which may be in the form of a flash of intense light.

Forming one end of laser cavity 12 is a wedged coupling mirror 24 located along a common optical axis 20 with laser rod 18; mirror 24 having a reflectivity of less than 100 percent, preferably 90–99 percent, in order to allow leakage 17 therethrough to be used in a manner set forth below. In addition, the wedge angle of mirror 24 should be 30 minutes of arc or greater. Adjacent mirror 24 is located a passive Q-switch dye solution 26 preferably in the form of cryptocyanine in acetone or 2,2' dicarbocyanine-iodide in methanol and held in position by a wedged (30 minutes of arc or greater) optical window 28 of quartz or glass. Surface 30 away from the dye solution 26 can be AR coated.

Interferometer 14 which is optically aligned with mirror 24 and also located along optical axis 20 is made up of a pair of wedged (30 minutes of arc or greater) mirrors 32 and 34, preferably having a reflectivity greater than 99 percent and ideally being 100 percent. Each of the mirrors 32 and 34 are mounted for slideable movement in the direction of arrows 36 and 38 on any suitable support such as rails 40 and 42, respectively. A 50 percent beam splitter 44 located along optical axis 20 is interposed between mirrors 32 and 34. Any suitable drive means such as motors 46 and 48 are interconnected in any conventional, electrical or mechanical manner to mirrors 32 and 34, respectively, for the purpose of positioning the mirrors. In addition to the mirrors phase shifter 16, which is also cut at a Brewster's angle, is interposed between a mirror and beam splitter 44 in one leg of the interferometer 15.

To understand how an output pulse is produced and how the system 10 of this invention functions, one must first condsider a standard Michelson interferometer 14' as shown in FIG. 3 illuminated by a continuous wave-input field $E_i$. Interferometer 14' consists of two 100 percent reflective mirrors 32' and 34' and a beam splitter 44' with properties described by R and T. Here $R^2$ and $T^2$ are the reflection and transmission coefficient of the interferometer beam splitter 44' and satisfy the relationship $R^2 + T^2 = 1$. With a cw plane wave input, $E_i = A e^{i\omega t}$ where A is the amplitude of the input wave, $\omega$ is the input laser frequency and $t$ represents time, return and output fields are generated which may be described by, $$E_{\text{return}} = E_r = A(R^2 e^{i\omega t} + T^2 e^{i\omega(t-t')}),$$

$$E_{\text{output}} = E_o = = RTA(e^{i\omega t} - e^{i\omega(t-t')}),$$

respectively. In this case $t' = 2(x-y)/c$ is the difference in the round-trip propagation times in the two arms of interferometer 18, $x$ and $y$ represent the lengths of the interferometer arms and $c$ is the speed of light.

IF the difference in the lengths of the interferometer arms is adjusted such that $\omega t' = 2\omega(x - y)/c = 2m\pi$, m being an integer then
$E_o = 0$
$E_r = A(R^2 + t^2) e^{i\omega t} = E_i$, and all radiation entering interferometer 14' is reflected back along the input as shown in the dotted lines in FIG. 3.

In addition to understanding the operation of a standard Michelson interferometer 14' one must also understand and consider a normal, mode-locked ruby laser cavity 12' as shown in FIG. 2 of the drawing. The standard laser cavity 12' is made up of a wedged mirror 24', a dye solution 26', a wedged window 28', ruby 18' and wedged mirror 16 all located along a common optical axis 20'. For normal operation mirror 24' must have a reflectivity of 99 percent or greater while mirror 19 has a reflectivity of between 40 and 70 percent. The output 21 of the normal-mode-locked laser is a train of pulses, each 5–50 psec in duration with individual pulses spaced in time by the round trip transit time of the laser cavity 12. Emission of this train of pulses is through mirror 19 and therefore the energy inside laser cavity 12' is contained in a short pulse which goes back and forth in the cavity, being partially transmitted each time it arrives at mirror 19.

In the instant invention as shown in FIG. 1 of the drawing, without phase shifter 16 in place, if the two arms of interferometer 14 are of equal length, beams returning from mirrors 32 and 34 add constructively along the direction returning to cavity 12, but cancel each other in the interferometer side outlet 50. Therefore, with arms of equal length, interferometer 14 serves as a highly reflecting mirror. A mode-locked pulse with duration set by the properties of the ruby 18 and the Q-switch dye 26 are produced in laser cavity 12.

Application of an abrupt quarterwave phase shift in one arm of the interferometer by the inclusion of phase shifter 16, after a mode-locked pulse has developed in cavity 12, will alter the summation at beam splitter 44 such that the pulse will be dumped into the interferometer side outlet 50. Thus, cavity dumping is possible without the use of calcite prisms.

If the arms of interferometer 14 are adjusted to be of slightly different optical length, with the difference ranging from zero to a few millimeters, the duration of the mode-locked pulses can be increased in a controlled and tunable fashion. The interferometer 14 then behaves as an etalon of tunable thickness, and the pulse of increased duration can still be dumped from the cavity by application of a quarterwave phase shift by phase shifter 16 in one arm of interferometer 14. It is emphasized that the duration of the pulse is not set by the response time of the pulsed phase shifter 16, but by the interferometer path length difference and by the properties of dye 26 and ruby 28. The response of the phase shifter 16 is only required to be rapid relative to the round-trip transit time of interferometer 14.

In order to produce the proper response in phase shifter 16 a suitable electronic circuitry must be incorporated within the laser system 10 which utilizes the leakage output 17. Such a circuitry may take the form of a charged co-axial line 52, with a charge limiting resistor 54 electrically connected between cable 52 and a high voltage source 56. The charge in line 52 is discharged by a laser activated switch 58 such as a laser triggered spark gap. Switch 58 is actuated by leakage output 17 so as to discharge line 52 into a coaxial line 60 which is electrically connected to electrodes 62 on phase shifter 16. This charge is then transmitted by line 64 to any suitable terminating load 66.

Although this invention has been described with reference to a mode-locked laser configuration, it should be understood to those skilled in the art that this invention is also capable of other embodiments within the spirt and scope of the appended claims.

For example, the laser system 10 is also suitable for a variety of other cavity dumping operations, being useable with cw (continuous wave), conventional long pulse, Q-switched, or mode-locked lasers. In other words, it is possible to incorporate the Michelson's interferometer 14 of this invention which contains phase shifter 16 into a variety of laser cavities 12 to produce bandwidth-limited cavity-dumped pulses.

In the continuous wave operation the cw cavity is in its simplest form being made up of a mirror 24, a gain medium 18, and interferometer 14 which includes phase shifter 16. This gain medium 18 can be either gaseous, liquid or solid state. For all cw operations it is assumed that the phase shifter 16 is an electro-optic crystal driven by voltage pulses generated in a conventional electronic circuit that can be independent of the lasing medium 18 and be in the form of for example, electrically triggered thyratrons or spark gaps. Such an arrangement is possible since no synchronization of the lasing and voltage pulses, contrary to the system set forth hereinabove in the preferred embodiment, is required, For cw Q-switched or cw mode-locked operation, the repetitive nature of the lasing still allows for external generation of voltage pulses although synchronization of pulses is required. With zero path length difference in the arms of interferometer 14, laser pulses whose frequencies are set by the gain medium, can be periodically dumped from the cavity. If the phase shifter 16 is driven by sub nanosecond voltage signals, the duration of the dumped optical pulses will be set by the time required to drain all radiation from the cavity. The pulse interval will be set by the time necessary to re-establish lasing following cavity dumping.

With the difference of the path length of the interferometer arms being different than zero, lasing frequency will be forced on to one or more reflection modes of the interferometer 14 and all cavity dumping features previously described are still possible so that frequency stabilized, variable-repetition rate pulses can periodically dump a mode locked pulse from the cw-mode-locked cavity. By adding a mode-locking element made up of mirror 24, dye solution 26 and window 28 to the system, cw mode-locking operation can be obtained. By the addition of a Q-switch to the basic cw cavity, repetitively Q-switched lasing can be obtained.

With the conventional long pulse laser the system of this invention would be in the form of a mirror 24, gain medium 18, and interferometer 14 containing phase shifter 16 therein. In this case the gain medium 18 would be excited by pulsed lamps rather than cw excitation.

With the difference in length of the arms of interferometer 14 being equal, lasing would take place within the natural line of medium 18 and one or more pulses would be dumped from interferometer 18 during a single flash lamp pulse. If the path difference of the arms of interferometer 18 were different than zero the laser emission would be locked in frequency to the reflection modes of the interferometer and possibly bandwidth limited. One or more frequency stabilized pulses would be generated during one pump pulse. In addition a mode-locking device could be contained within this laser system. A Q-switched configuration which utilizes the interferometer 14 containing phase shifter 16 therein, would in addition to mirror 24 and gain medium 18 also contain a conventional Q-switch therebetween.

We claim:

1. A laser system for producing bandwidth-limited, cavity-dumped pulses comprising a laser medium, a reflective surface located adjacent one end of said laser medium and located along a common optical axis with said laser medium, a Michelson interferometer located adjacent the other end of said laser medium and in optical alignment with said reflective surface, said Michelson interferometer having a beam splitter, a first reflective surface and a second reflective surface, both said surfaces being substantially totally reflective, and a means interposed between said beam splitter and one of said substantially totally reflective surfaces for shifting the phase of that portion of a laser beam directed from said beam splitter to said one substantially totally reflective surface whereby upon a 90° phase shift of said portion of said laser beam, said bandwidth-limited pulse will be dumped from said laser system.

2. A laser system for producing bandwidth-limited, cavity-dumped pulses as defined in claim 1 further comprising a laser actuated switch operatively connected between said laser medium and said phase shifting means for actuating said phase shifting means.

3. A laser system for producing bandwidth-limited, cavity-dumped pulses as defined in claim 1 wherein means are connected to said first and second reflective surfaces of said Michelson interferometer for moving said first and second reflective surfaces a predetermined distance from said beam splitter along their respective optical axis.

4. A laser system for producing bandwidth-limited, cavity-dumped pulses as defined in claim 3 wherein said phase shifting means is in the form of an electro-optic crystal having its ends cut at Brewster's angle.

5. A laser system for producing bandwidth-limited, cavity-dumped pulses as defined in claim 4 wherein said reflective surface located adjacent one end of said laser medium is a wedged-shaped mirror having a reflectivity of between 90–99 percent.

6. A laser system for producing bandwidth-limited, cavity-dumped pulses as defined in claim 5 further comprising a laser actuated switch operably connected between said laser medium and said phase shifting means for actuating said phase shifting means.

7. A laser system for producing bandwidth-limited, cavity-dumped pulses as defined in claim 6 wherein said first and second reflective surfaces are in the form of wedge shaped mirrors.

8. A laser system for producing bandwidth-limited, cavity-dumped pulses as defined in claim 7 wherein said laser medium has its ends cut at Brewster's angle.

9. A laser system for producing bandwidth-limited, cavity-dumped pulses as defined in claim 8 wherein said phase shifting means comprises a KDP crystal.

* * * * *